(12) United States Patent
Patil

(10) Patent No.: US 9,989,107 B2
(45) Date of Patent: Jun. 5, 2018

(54) HYDRAULIC FORCE TRANSMITTING ASSEMBLY FOR BRAKES AND CLUTCHES

(71) Applicant: Eaton Intelligent Power Limited, Dublin OT (IE)

(72) Inventor: Yogesh Bhanudas Patil, Pune (IN)

(73) Assignee: Eaton Intelligent Power Limited, Dublin (IE)

(*) Notice: Subject to any disclaimer, the term of this patent is extended or adjusted under 35 U.S.C. 154(b) by 154 days.

(21) Appl. No.: 15/208,786

(22) Filed: Jul. 13, 2016

(65) Prior Publication Data
US 2018/0017120 A1 Jan. 18, 2018

(51) Int. Cl.
| | | |
|---|---|---|
| *F16D 25/0638* | (2006.01) | |
| *F16D 25/12* | (2006.01) | |
| *F16D 55/40* | (2006.01) | |
| *F16D 65/38* | (2006.01) | |
| *F16D 55/24* | (2006.01) | |
| *F16D 121/06* | (2012.01) | |

(52) U.S. Cl.
CPC ....... *F16D 25/0638* (2013.01); *F16D 25/126* (2013.01); *F16D 55/24* (2013.01); *F16D 55/40* (2013.01); *F16D 65/38* (2013.01); *F16D 2065/383* (2013.01); *F16D 2121/06* (2013.01)

(58) Field of Classification Search
CPC .... F16D 25/0638; F16D 25/126; F16D 55/24; F16D 55/40; F16D 65/38; F16D 2065/383; F16D 2121/06; F16D 13/52; F16D 13/75
See application file for complete search history.

(56) References Cited

U.S. PATENT DOCUMENTS

| | | | | |
|---|---|---|---|---|
| 3,862,678 A | * | 1/1975 | Collins | ............... F16D 25/0635 188/264 D |
| 4,609,076 A | * | 9/1986 | Collins | ................... F16D 55/38 188/170 |
| 4,615,418 A | | 10/1986 | Atwell | |
| 4,907,683 A | * | 3/1990 | Patel | ................... F16D 25/0635 188/170 |
| 5,383,544 A | | 1/1995 | Patel | |
| 2010/0116616 A1 | * | 5/2010 | Pardee | ................. F16D 13/757 192/84.961 |

* cited by examiner

*Primary Examiner* — Richard M Lorence
(74) *Attorney, Agent, or Firm* — Fay Sharpe LLP

(57) ABSTRACT

A hydraulic fluid pressure operated torque transmitting assembly for use as a brake or clutch which utilizes hydraulic pressure operated cylinders in a housing moveable with respect to an axially stationary spring housing to move a pressure plate against rotating discs and reaction plates. Hydraulic fluid pressure disengages the torque transmission and loss of hydraulic pressure enables springs in the spring housing to move the pressure plate to engage the friction discs for torque transmission. Radially removable spacers permit the spring housing position on mounting studs to be adjusted for compensating for friction disc wear. The hydraulic cylinders each have a drain port communicating with an annular collector groove in the cylinder bore. The drain ports are interconnected through flexible conduits connected to a master drain port in the cylinder housing.

21 Claims, 13 Drawing Sheets

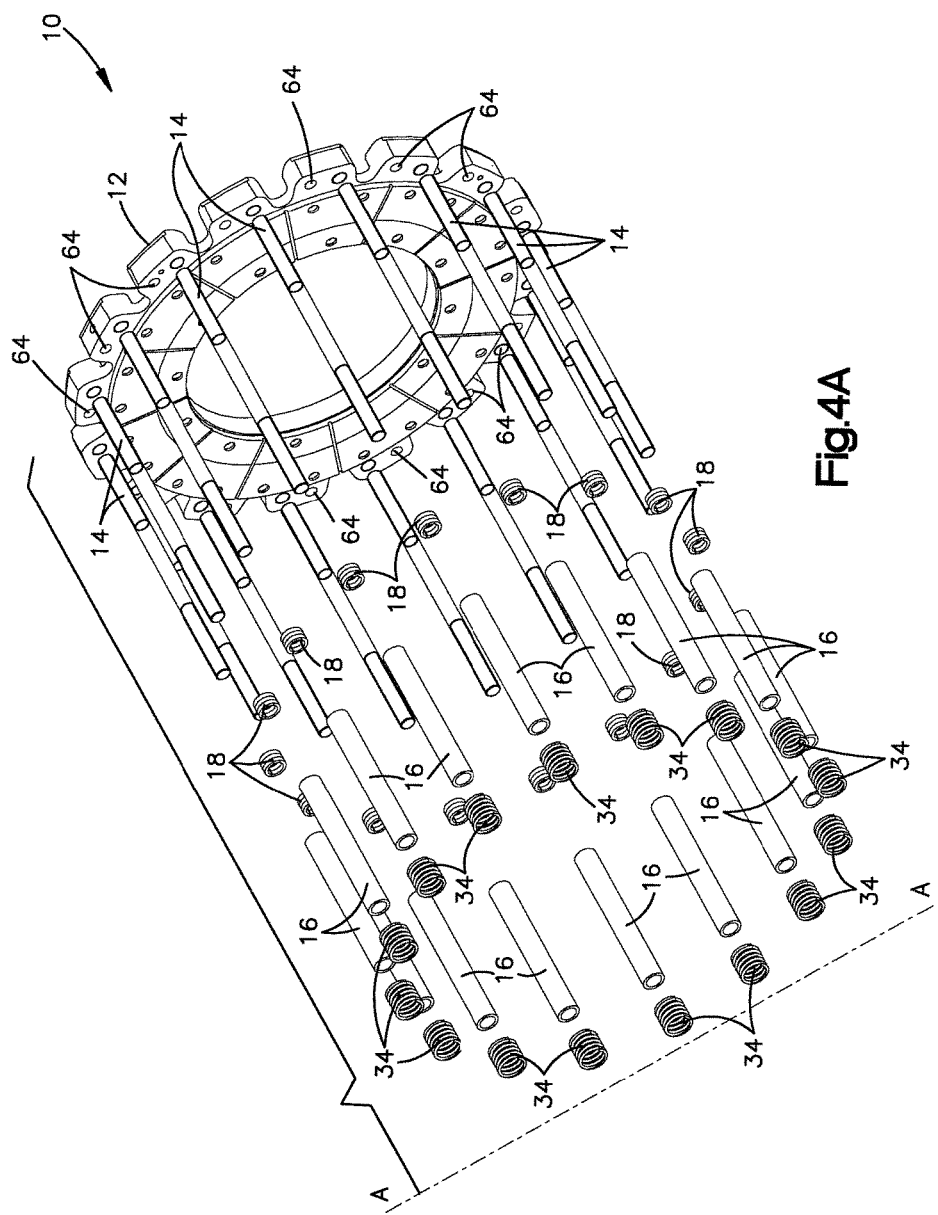

HYDRAULIC FORCE TRANSMITTING ASSEMBLY FOR BRAKES AND CLUTCHES

BACKGROUND

The present disclosure relates to fluid pressure operated rotary torque transmitting devices for use in brakes and clutches. Heretofore, fluid pressure operated clutches and brakes have typically employed a pneumatically pressurized bladder for actuating brake shoes or have employed pistons for providing pressure against friction discs; and, have typically used pneumatic pressure from available air compressors. These types of pneumatically operated brakes and clutches are limited in their power transmitting density by virtue of the limits of available air compressors which generally do not provide air pressure higher than 150 psi (1.034 MPa). Thus, for relatively high power or torque transmission, the volume or size of the brake or clutch required to provide the desired torque transmission has resulted in prohibitively large power transmission assemblies for the desired application. This has particularly been a problem for relatively large clutches/brakes capable of transmitting torque of at least one hundred eighty thousand (180,000) pound-feet ($2.43 \times 10^5$ Newton-meters). Thus, it has been found desirable to provide fluid pressure operated brakes and clutches which may be operated with commercially available higher pressure hydraulic fluid pressure sources, thereby eliminating the cost of specialized high pressure pneumatic compressor equipment. An example of such a hydraulically operating brake or clutch which disengages upon release of the hydraulic pressure is that described in U.S. Pat. No. 4,615,418 and U.S. Pat. No. 5,383,544. Such devices thus provide for engagement in the event of loss of hydraulic fluid pressure.

However, as the annular friction discs wear in service, in the aforesaid type hydraulically operated brakes and clutches, the engagement position of the discs and reaction members or plates is shifted to a position more distant from the actuating springs. Wear thus moves the springs closer to their free length position and therefore reduces the spring force available for engagement. Heretofore, in order to maintain a desired engagement force of the springs, after significant wear of the friction discs, it has been necessary to remove the brake or clutch from service, disassemble the unit and either reposition the mounting of the springs to accommodate the wear on the friction discs or to replace the friction discs.

It has therefore been desired to provide a convenient way or means of adjusting the engagement position of the friction discs in a hydraulically operated brake or clutch assembly of the type which is disengaged by release of the hydraulic pressure without disassembly of the unit.

SUMMARY

The present disclosure provides a torque transmitting assembly which is operated by hydraulic fluid pressure; and, utilizes hydraulic fluid pressure to disengage the frictional force of friction discs against reaction plates when fluid pressure is applied. The assembly has a plurality of fluid pressure cylinders disposed about a unitary cylinder housing; and, upon release of the hydraulic fluid pressure from the cylinders, a plurality of circumferentially spaced spring sets provide the desired axial force to cause the reaction members to contact the friction discs and produce the desired torque against a retaining member. The retaining member may either be stationary for use as a brake or mounted on a rotating output shaft for use as a clutch.

The assembly of the present disclosure addresses the above-described problem of accommodating wear of the friction discs in a hydraulically operated brake or clutch, where engagement is accomplished by spring force, by providing removable spacers for locating the spring housing on the base or mounting member. In the disclosed version of the present hydraulically operated clutch/brake assembly, the spring housing is secured against a plurality of spacers on studs extending from the mounting member and retained thereon by threaded fasteners. One of the spacers on each stud is configured to be radially removed without requiring disassembly of the entire brake/clutch. The radially removable spacer of the assembly of the present disclosure is slit radially and has a portion of the wall thereof opposite the slit weakened to permit opening of the spacer by insertion of a tool in the slit for opening and radial removal of the spacer from the mounting stud. Upon removal of the radially slit spacer, the threaded fasteners on the studs may then be tightened to reposition the spring housing against the remaining spacers and thus accommodate for wear in the friction discs, thereby retaining the compression of the springs and maintaining the engagement force of the brake/clutch assembly without the need for removal of the assembly from service and disassembly for repositioning the spring housing.

BRIEF DESCRIPTION OF THE DRAWINGS

FIG. 4A and FIG. 4B together along parting line A-A are an exploded view of the assembly of FIG. 1;

DETAILED DESCRIPTION

Figure 1:
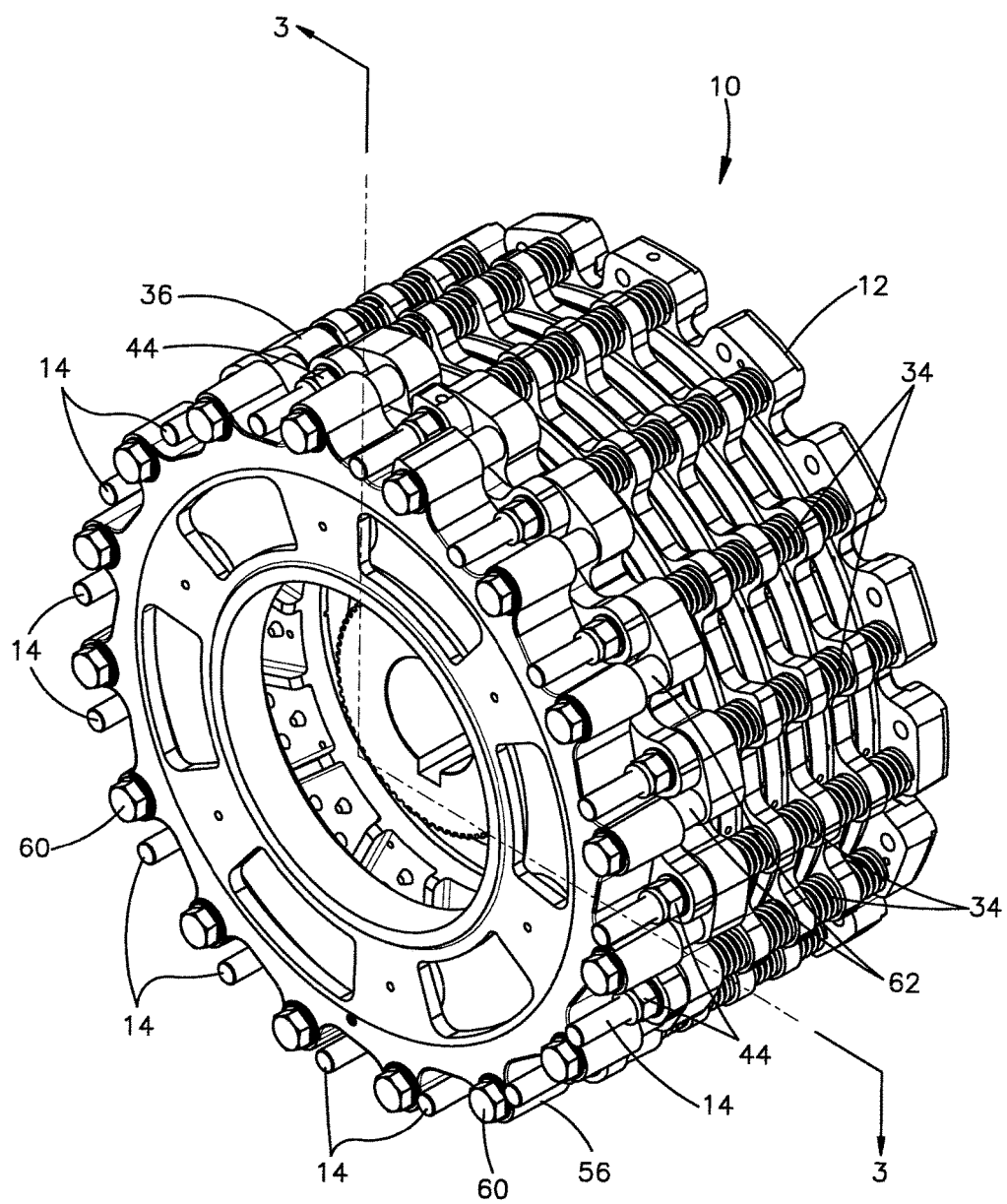
FIG. 1 is an axonometric view of the brake/clutch assembly of the present disclosure.
Figure 2:
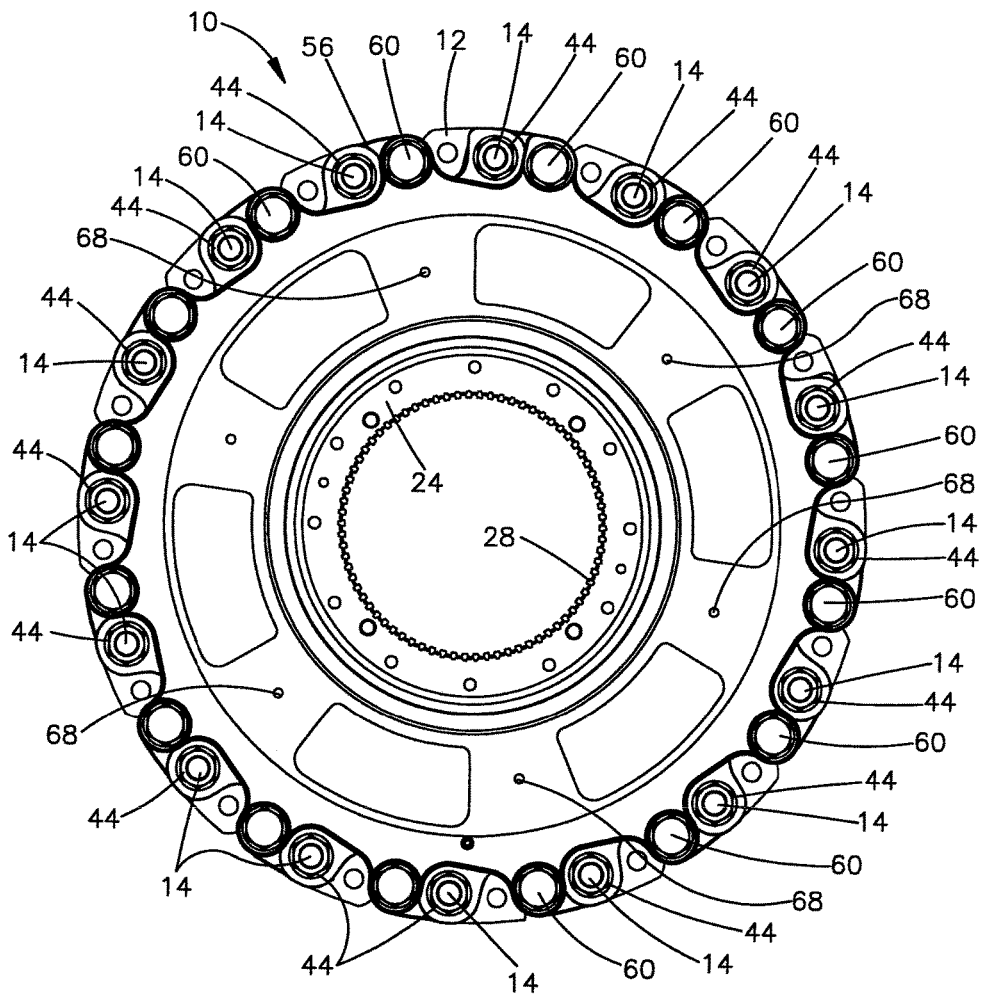
FIG. 2 is a left-hand end view of the assembly of FIG. 1.
Figure 3:
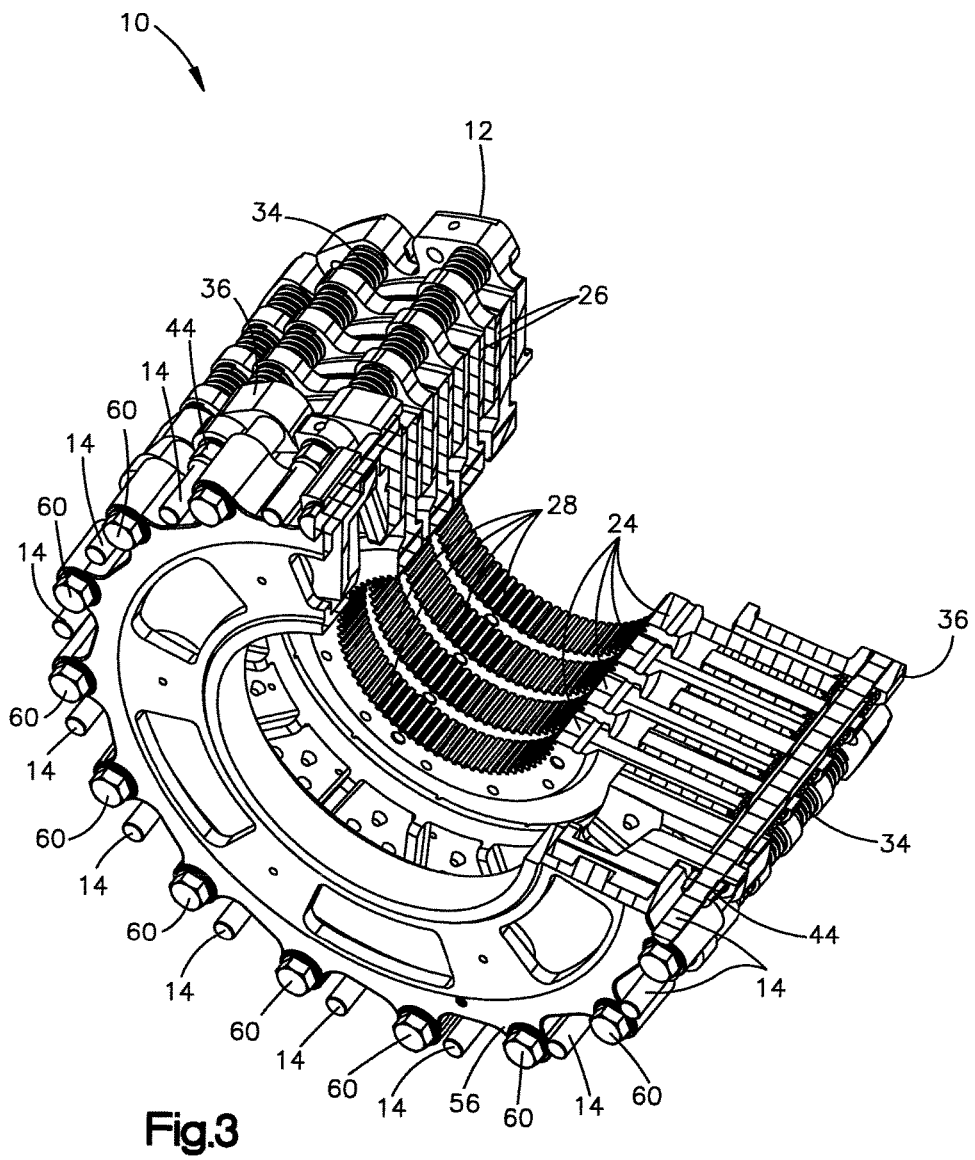
FIG. 3 is a view of FIG. 1 quarter sectioned along section indicating lines 3-3 to illustrate the interior components.

Referring to FIGS. 1 through 7, the hydraulically operated brake/clutch assembly of the present disclosure is indicated generally at 10 and includes an annular base or mounting member 12 which has a plurality of axially extending mounting studs 14 attached thereto in circumferentially spaced arrangement. It will be understood that for brake applications of the assembly 10, the base or mounting member 12 is attached to a stationary structure (not shown); whereas, for a clutch application, the mounting member 12 would be attached to a rotating output shaft (not shown).

Each of the studs 14 has received thereover an elongated tubular spacer 16 and a radially removable annular spacer 18. Each of the spacers 18 is radially removable without disassembly of the brake/clutch 10 as will hereinafter be described; and each spacer 18 has an axial length predetermined to permit adjustment for wear in service after their removal.

Figure 4B:
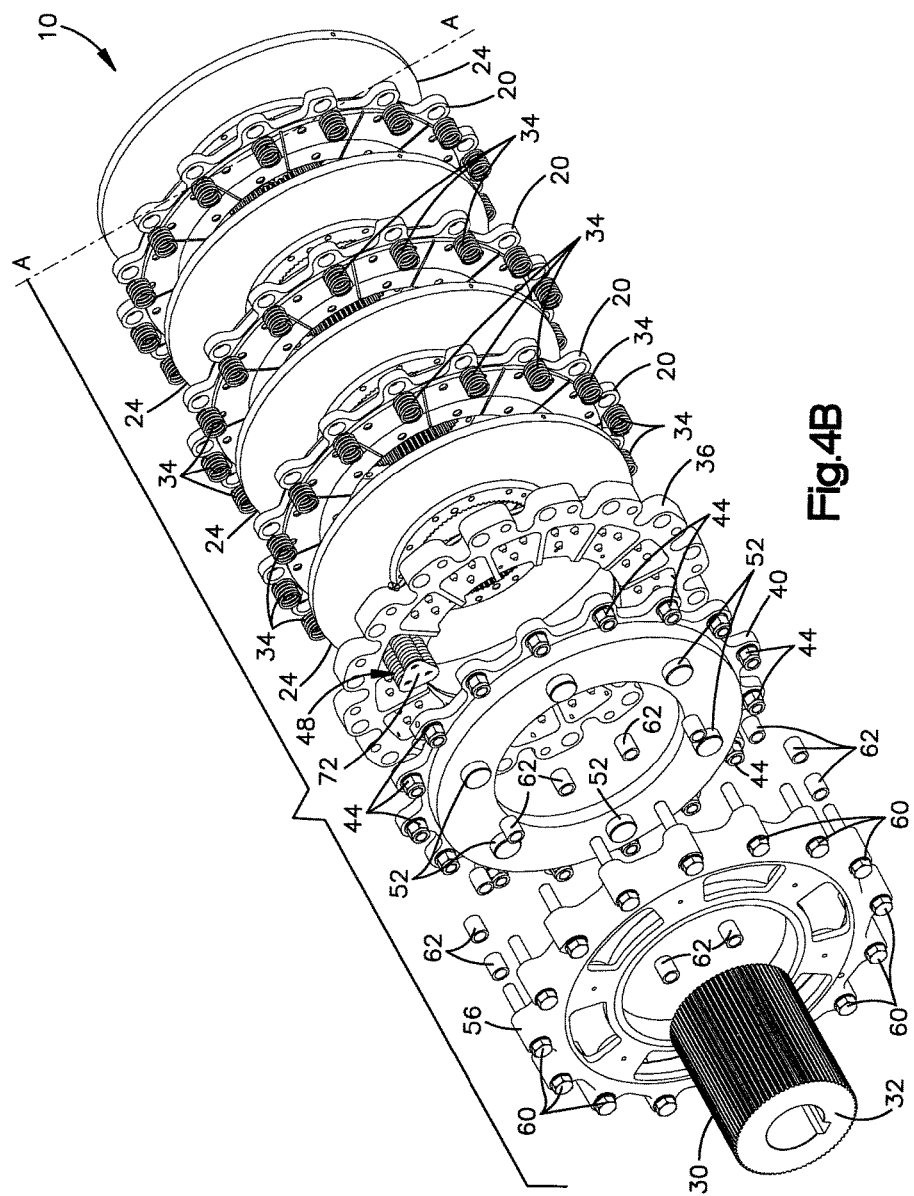
Figure 5:
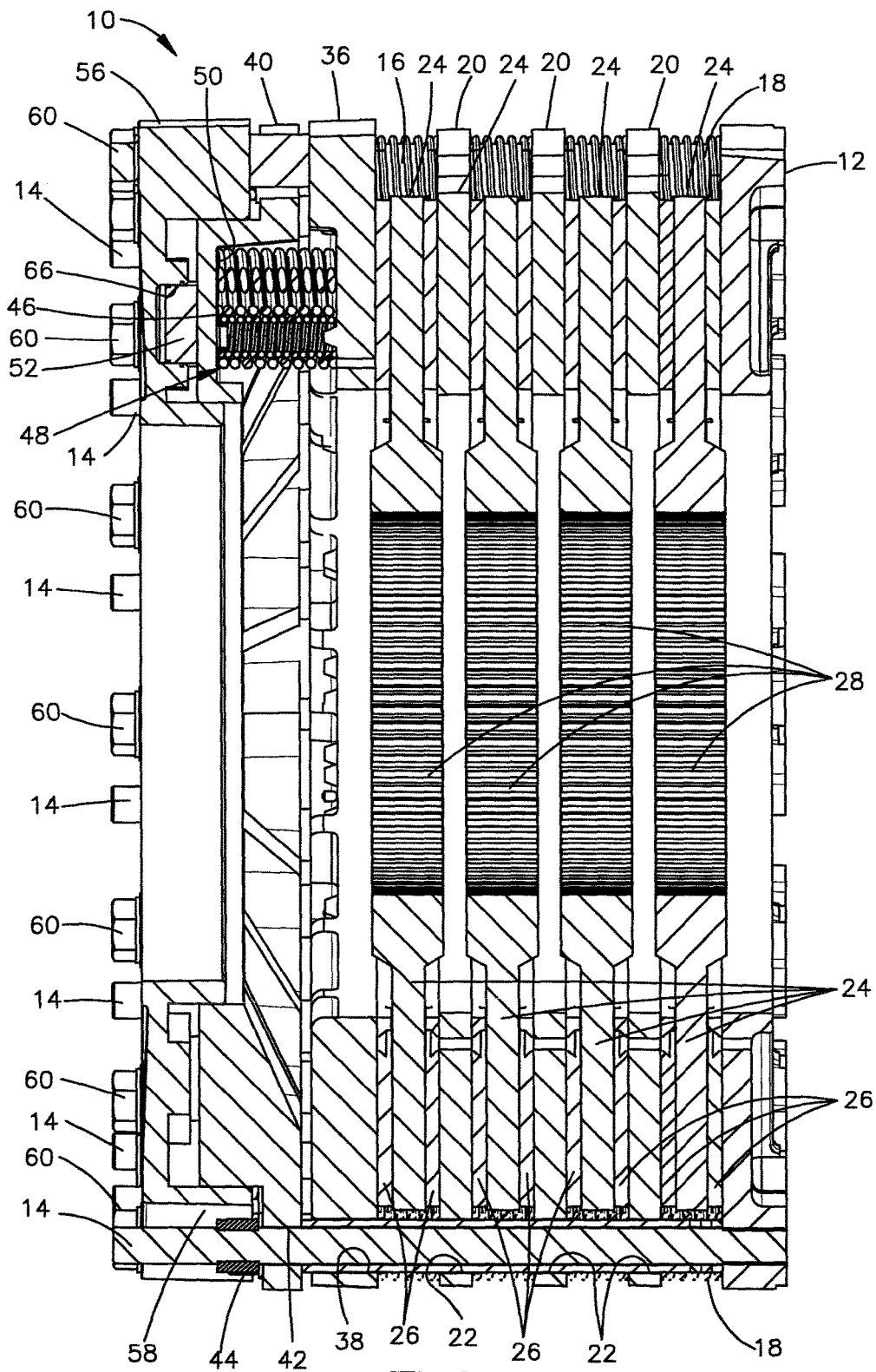
FIG. 5 is an enlarged view of the section of FIG. 3.
Figure 6:
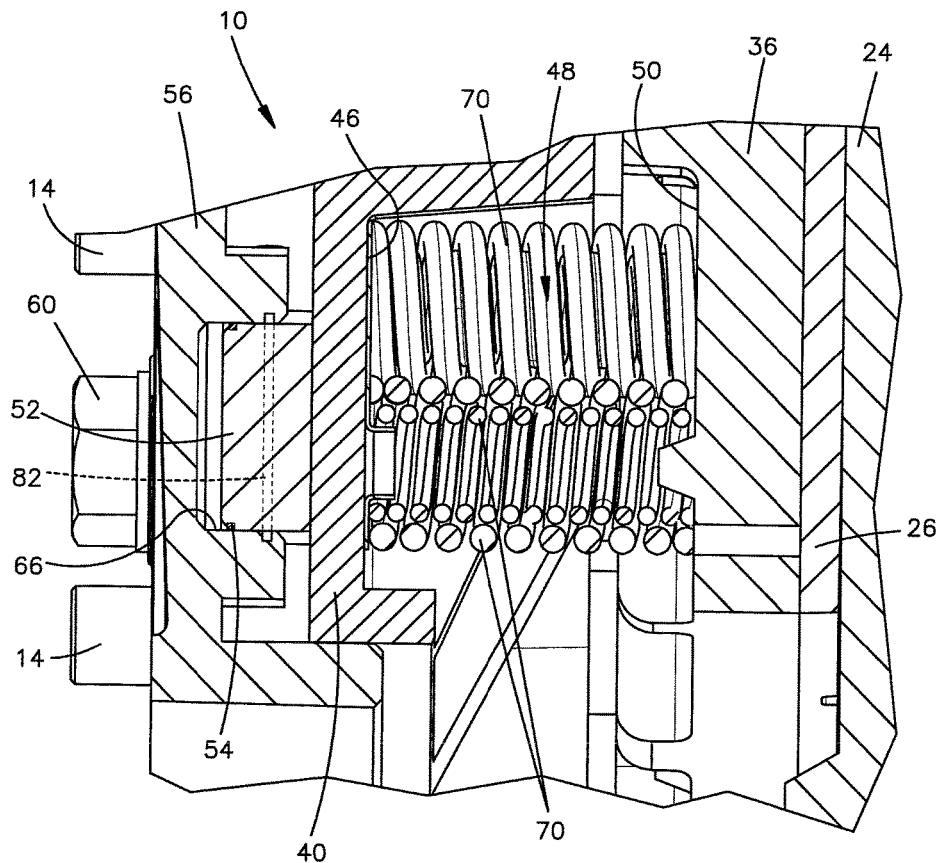
FIG. 6 is an enlarged view of another portion of the section of FIG. 3.
Figure 7:
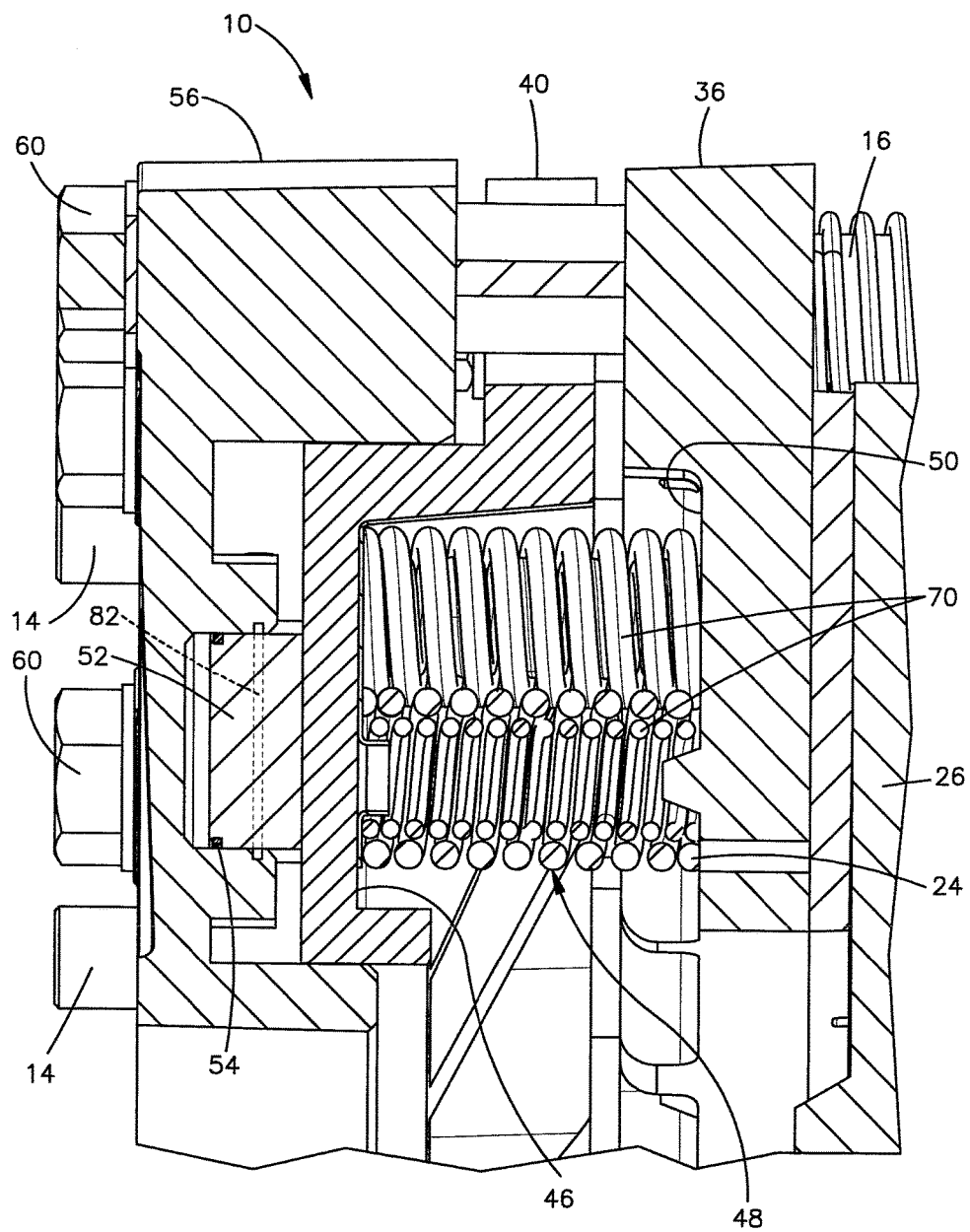
FIG. 7 is an enlarged view of a portion of FIG. 6.

A plurality of annular reaction plates 20 each have apertures 22 formed about the periphery thereof which are received over the spacers 16 in an axially spaced arrangement and sized so as to be in sliding engagement on the spacers 16. Disposed between each of the reaction plates 20 and the mounting member 12 is an annular friction disk 24 having friction material 26 provided on opposite axial faces thereof as denoted in FIG. 5. Each of the annular discs 24 has grooves or spline surfaces 28 formed about the inner periphery thereof. The spline surfaces are configured for engagement with corresponding surfaces 30 provided on an input shaft or driving gear 32, as illustrated in FIG. 4.

A return spring 34 is disposed over each of the spacers 16 between the reaction plates and the mounting plate 12 and an annular pressure plate 36 which is also provided with apertures 38 for being slidably received over the spacers 16 on mounting studs 14. The springs 34 thus urge the reaction plates apart in the disengaged state to release friction between the discs 26 and the reaction plates 20.

An annular spring housing 40 has a plurality of circumferentially spaced apertures 42 which are located such that each is received over one of the studs 14; and, the spring housing is secured against spacers 16 by threaded fasteners such as lock nuts 44. The spring housing 40 has a plurality of circumferentially spaced pockets 46 formed therein into each of which is received one reaction end of a spring set indicated generally at 48. The reaction end opposite the one reaction end of each spring set 48, is received in one of a plurality of circumferentially spaced recesses 50 formed about the axial face of the pressure plate 36 which faces opposite the friction discs.

The axial face of the spring housing 40 opposite the face with recesses 50, has provided thereon a plurality of circumferentially spaced pistons 52 extending axially therefrom and which may be integrally formed with the spring housing 40, as for example, by casting.

A cylinder housing 56 has a plurality of circumferentially spaced apertures 58 which are located so as to be secured by bolts 60 and spacers 62 with the bolts 60 engaging threaded apertures 64 provided in pressure plate 36. The pressure plate 36 thus moves axially with the cylinder housing 56. The cylinder housing 56 has a plurality of bores 66 located so as to have received in each thereof one of the pistons 52 provided on the spring housing 40. The cylinder housing has a plurality of fluid pressure ports 68, each of which communicates with one of the cylinder bores 66 for enabling introduction of hydraulic fluid pressure into the cylinder bores.

Each of the spring sets 48 includes a plurality of coil springs 70 which are sized and configured to provide the desired axial force. Spring set 48 may include an end plate 72, to which the springs 70 may be attached at one reaction end, for facilitating assembly.

In operation, as hydraulic fluid is introduced through port 68 into the cylinder bores 66, the hydraulic fluid pressure acting on the ends of the pistons 52 causes the cylinder housing 56 to move leftward or in a direction to effect pulling of the pressure plate 36 away from the friction discs 24 and reaction plates 20 to disengage the frictional contact between the reaction plates and the friction discs thus preventing transmission of torque between the input or drive shaft 32 and retaining member 12. Upon release of the hydraulic fluid pressure in the cylinders 66, the spring sets 48 exert sufficient axial force upon the pressure plate 36 to move the pressure plate 36 and reaction plate 20 into frictional driving contact with their adjacent friction discs 24 and effect torque transmission between the input shaft 32 and the retaining member 12.

As the friction discs 24 wear in service, the position of the pressure plate 36 at the point of engagement is moved axially rightward or in a direction toward the mounting plate 12, such that the springs 70 in the spring set 48 are extended incrementally toward their free length. This extension of the spring set 48 decreases the axial force at the point of engagement of the pressure plate 36 with the friction discs 24. This results in decreased friction force available for torque transmission at engagement. In the event that the wear has decreased the frictional force available for torque transmission to an unacceptable level, the spacers 18 may be removed, without disassembly of the unit 10, to enable tightening of the lock nuts 44 to reposition the spring housing to compress spring sets 48 to retain the desired axial force on the pressure plate 36.

Figure 8:
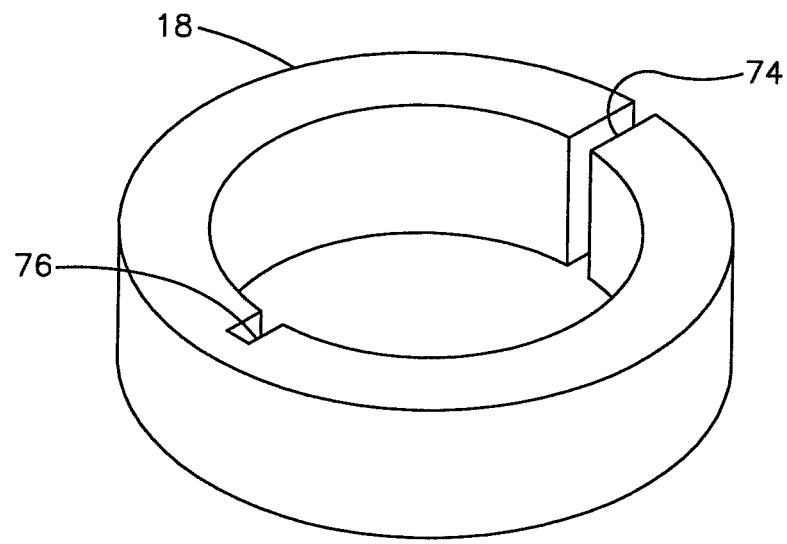
FIG. 8 is an axonometric view of the removable spacer of the assembly of FIG. 1.
Figure 9:
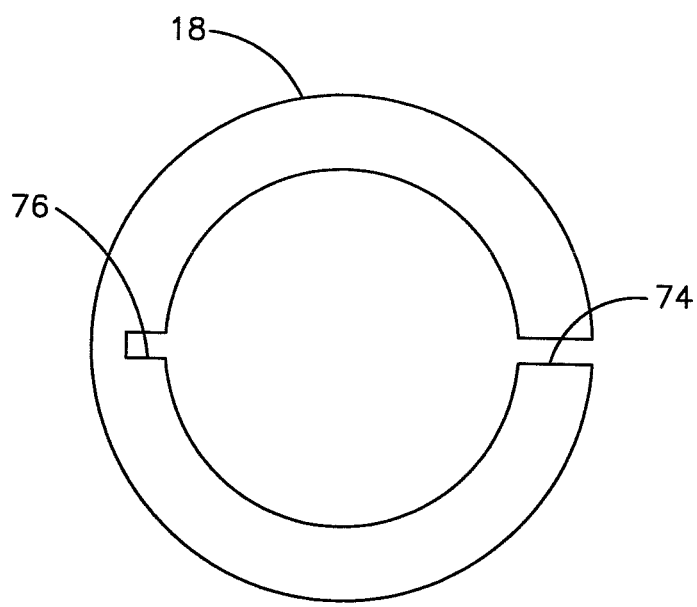
FIG. 9 is a top view of the spacer of FIG. 8.
Figure 10:
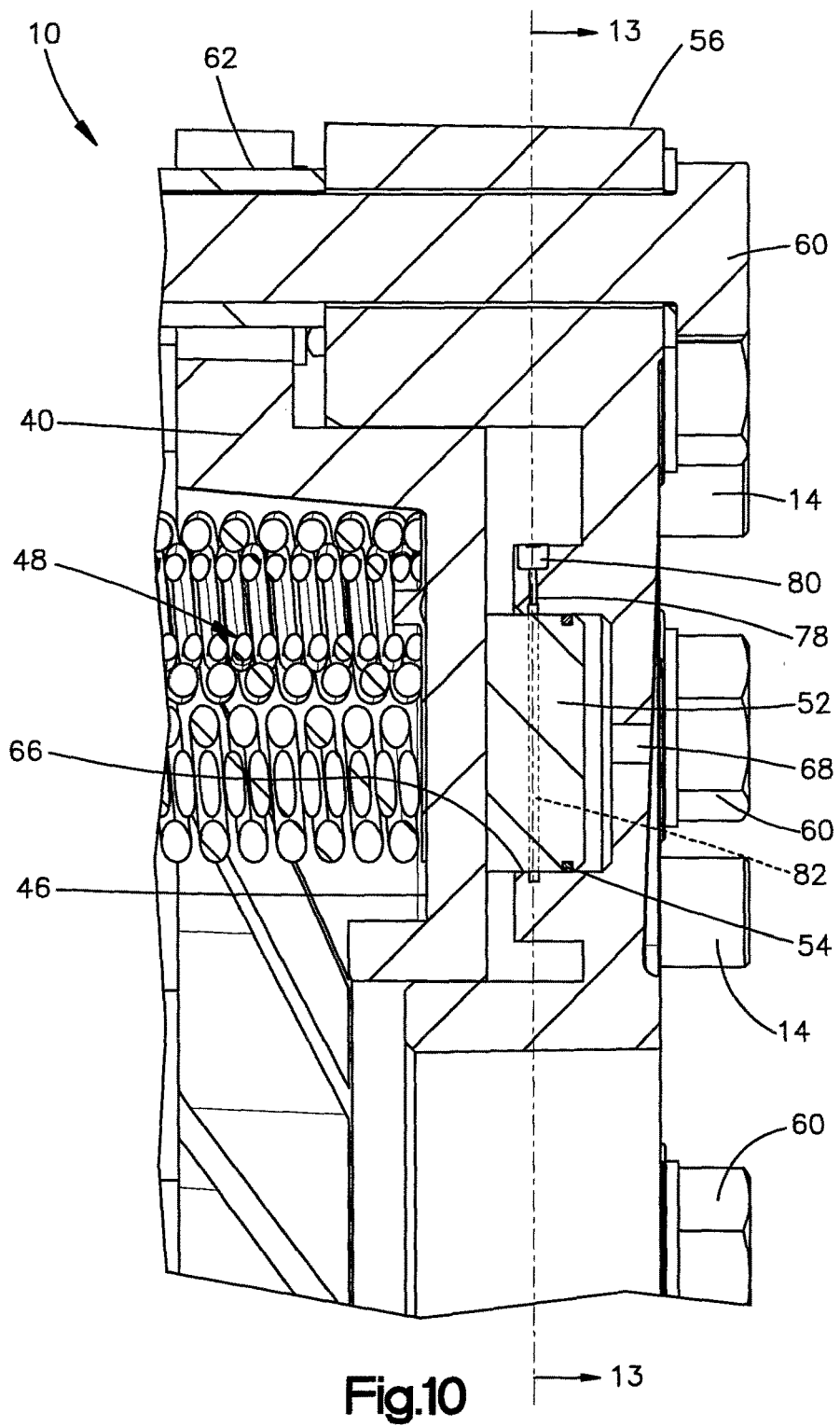
FIG. 10 is an enlarged portion of the section view of FIG. 3 showing one of the cylinder drain ports.
Figure 11:
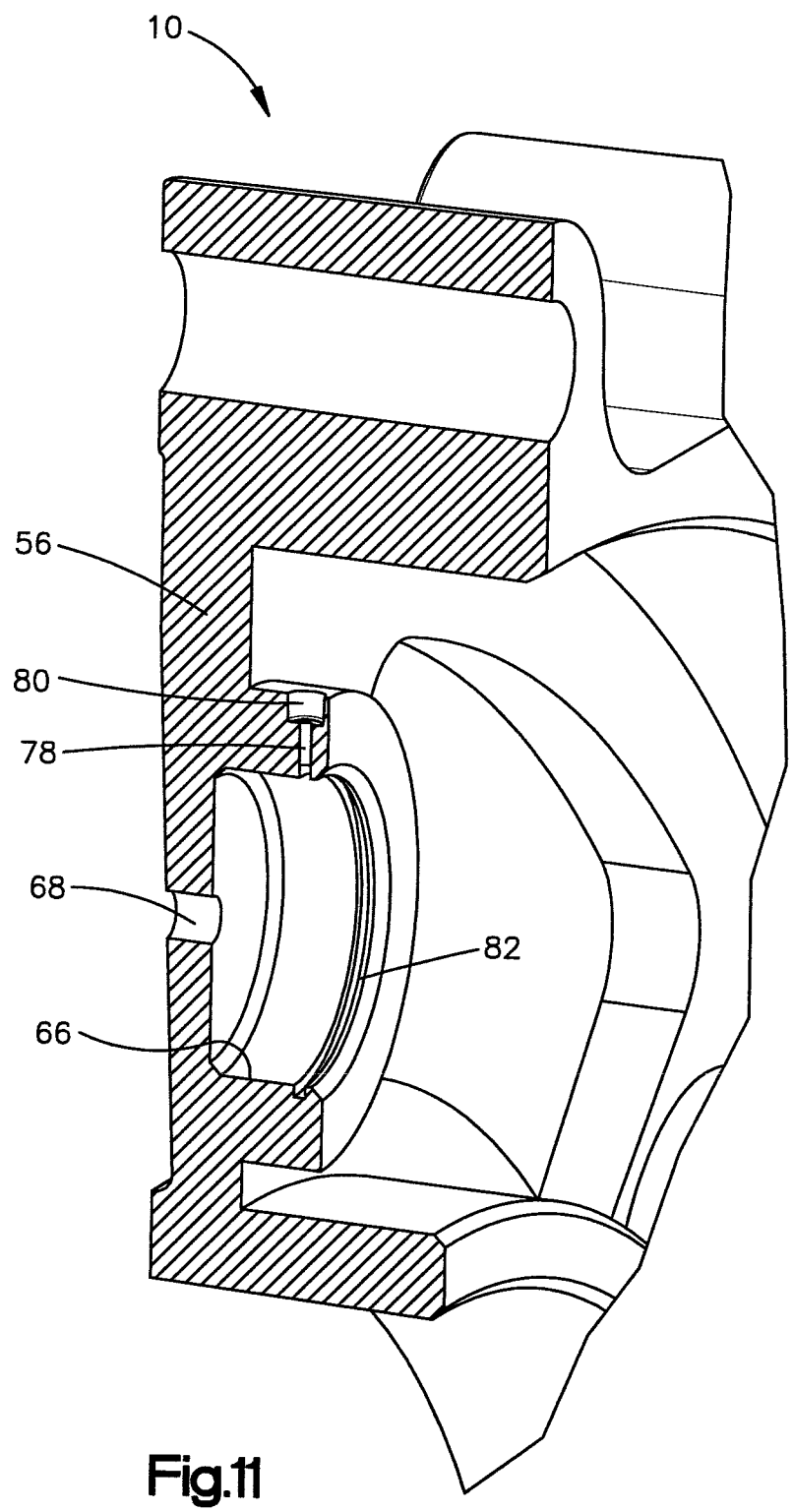
FIG. 11 is a portion of a section view of one of the piston cylinders with the piston removed.
Figure 12:
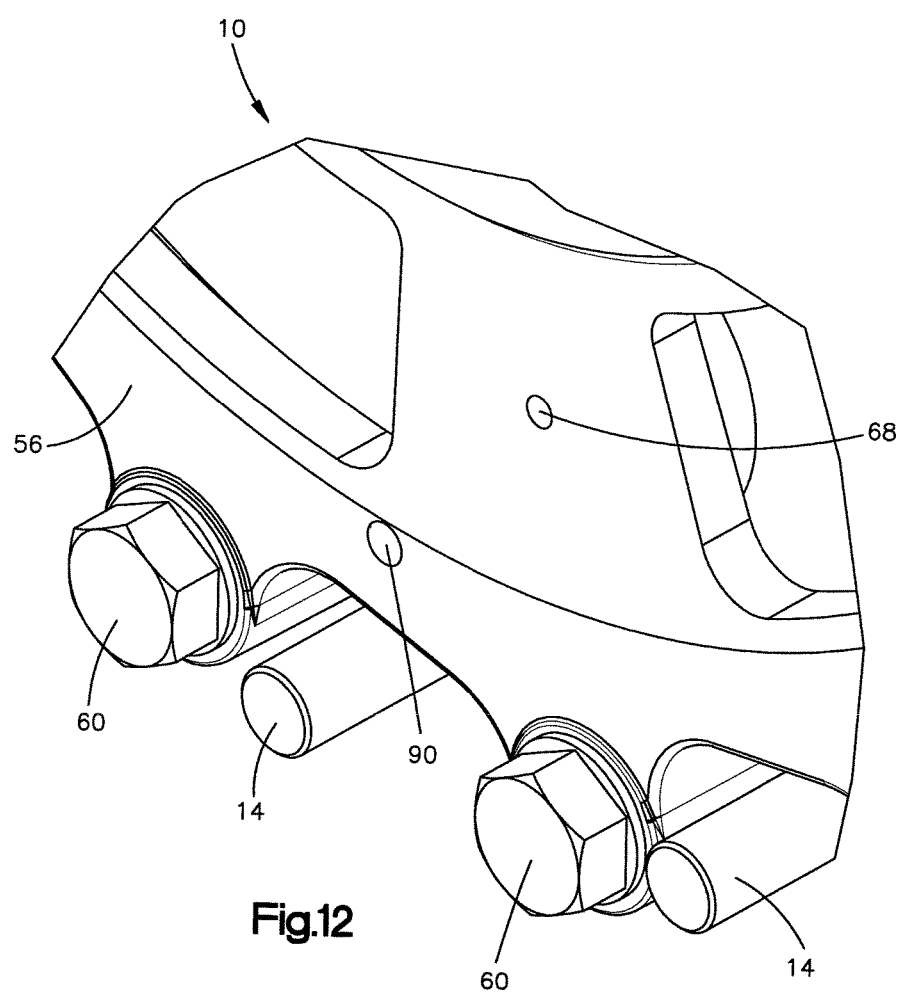
FIG. 12 is an enlarged view of portion of FIG. 1.

Referring to FIGS. 8 and 9, one of the removable spacers 18 is shown in greater detail, wherein the spacer has a radial slit 74 formed through the wall to enable insertion of a tool to pry the spacer 18 to an open condition sufficient to enable removing the spacer radially from the studs 14. In the version shown in FIGS. 8 and 9, the spacer 18 includes a pre-weakened area formed in the wall thereof diametrically opposite the slit 74 as denoted by reference number 76. The notch 76 thus reduces the thickness of the spacer wall to facilitate opening of the spacer for removal from stud 14. Alternately, the pre-weakened region may be provided by forming the spacer with a radially thinner wall section in the region diametrically opposite the slit 74.

Figure 13:
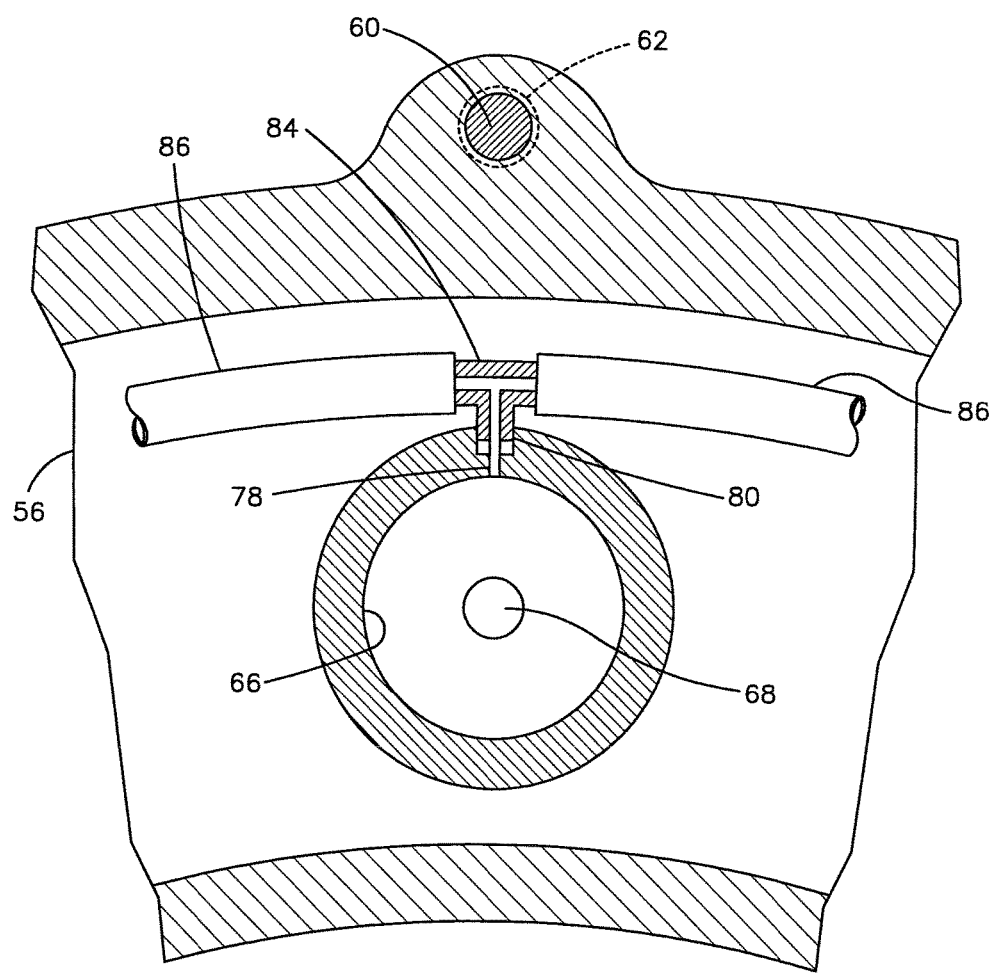
FIG. 13 is a section view taken along section indicating lines 13-13 of FIG. 10.

Referring to FIG. 10 through 13, each of the piston cylinder bores 66 has a radially extending drain port 78 which extends through the wall of the cylinder bore; and, each port 78 which has at its radially outer end thereof provided with a counter bore 80, which may be threaded for insertion of a fitting as will hereafter be described. Each of the radial drain ports 78 communicates at its radially inner end with an annular collector groove 82 formed in the wall of the bore 66. With reference to FIG. 13, a three-way or "T" fitting 84 is provided and has its common end received in threaded engagement with the counter bore 80. The opposite ends of the three-way fitting are connected to flexible hoses 86, each of which communicates with the interior passage in the three-way fitting and thus with the piston bore 66. The hoses 86 have their opposite ends connected to an adjacent three-way fitting provided for each of the adjacent piston cylinders 56 such that the hoses are disposed in circumferential arrangement in the annular space radially outwardly of each of the cylinder bores 66. The hoses are connected by a separate (unshown) three-way fitting to a master drain port 88 provided in the end face of the cylinder housing 56 as denoted by reference numeral 90 in FIG. 12. This arrangement permits draining of all the hydraulic cylinder bores 66 into a common return line to the hydraulic fluid source.

A hydraulically operated torque transmitting assembly of the present disclosure thus provides a clutch or brake disengaged by introduction of hydraulic fluid pressure and upon loss of hydraulic fluid pressure, engaged by springs. The assembly has radially removable spacers provided on the mounting studs which, upon axial wear of the friction discs, may be radially removed to permit tightening of the threaded fasteners or lock nuts thereby moving the spring housing axially against the remaining spacers on the mounting studs to move the engagement springs to accommodate the pressure plate engagement point to thus accommodate the wear of the friction discs without requiring disassembly of the unit. The hydraulic piston cylinder bores each have a drain port. The drain port communicates with the annular collector groove formed in the inner periphery of the cylinder. The cylinder bore drain ports are interconnected by hoses which are connected to a master drain port in the cylinder housing.

The exemplary versions have been described with reference to the drawings. Obviously, modifications and alterations will occur to others upon reading and understanding the preceding detailed description. It is intended that the exemplary versions be construed as including all such modifications and alterations insofar as they come within the scope of the appended claims or the equivalents thereof.

The invention claimed is:

1. A hydraulically operated rotary torque transmitting assembly for use in brakes and clutches comprising:
   (a) a mounting member;
   (b) a plurality of elongated guide members extending from the mounting member in circumferentially spaced arrangement;
   (c) at least one annular reaction member received on the mounting members in free sliding engagement;
   (d) at least one annular friction disc disposed intermediate the reaction member and the mounting member, the friction disc having interior surfaces configured for engaging a power transmission shaft;
   (e) a spring housing secured to the guide members and having one reaction end of a spring set in contact therewith on a surface thereof, wherein the spring housing has a plurality of pistons provided on a surface opposite the spring set;
   (f) a plurality of annular spacers disposed over each of the guide members with the length thereof dimensioned to position the spring housing on the guide members, wherein one of the plurality of spacers is radially removable without requiring disassembly and is sized such that upon removal, the spring housing can be adjustably repositioned on the guide members to accommodate axial wear of the friction discs;
   (g) a pressure plate slidably guided on the guide members and disposed intermediate the spring housing and the at least one friction disc, wherein each spring set has a reaction end opposite the one reaction end thereof contacting the pressure plate and is operative to urge the pressure plate into frictional engagement with the at least one friction disc;
   (h) a cylinder housing spaced from and secured to the pressure plate adjacent the pistons of the spring housing, wherein the cylinder housing has a plurality of bores formed therein, each having one of the pistons slidably received therein, and the cylinder housing has a fluid pressure port communicating with each bore, wherein upon introduction of hydraulic fluid pressure in the fluid pressure port, the pistons cause cylinder housing to move in a direction to overcome the force of the spring sets and move the pressure plate to disengage from the at least one friction disc and, upon release of hydraulic fluid pressure, the spring sets are operative to move the pressure plate into engagement with the at least one friction disc and the at least one friction disc into frictional contact with the mounting member for transmitting torque from the power transmission shaft to the mounting member.

2. The assembly of claim 1, wherein the cylinder housing is a one-piece casting.

3. The assembly of claim 1, further comprising a plurality of annular reaction members and a plurality of friction discs disposed in axially alternating arrangement with respect to the axis of rotation.

4. The assembly of claim 1, wherein the mounting member comprises an annular plate.

5. The assembly of claim 1, wherein the spring housing has an annular configuration.

6. The assembly of claim 1, wherein each spring set comprises a plurality of coil springs.

7. The assembly of claim 1, wherein the pressure plate has a plurality of recesses formed therein with the opposite reaction end of a spring set received therein.

8. The assembly of claim 1, wherein the spring housing is a one-piece casting.

9. The assembly of claim 1, wherein the guide members comprise a plurality of circumferentially spaced studs with the spring housing secured thereon with threaded fasteners.

10. The assembly of claim 1, wherein the cylinder housing is fixedly secured to the pressure plate with threaded fasteners and spacers.

11. The assembly of claim 1, further comprising a plurality of alternately disposed reaction members and friction discs.

12. The assembly of claim 1, wherein the interior surfaces for engaging a power transmission shaft comprise a plurality of splines.

13. The assembly of claim 1, wherein the spring housing includes a plurality of pockets each having the one reaction end of one of the spring sets received therein.

14. The assembly of claim 1, wherein the pressure plate has a plurality of recesses each having the reaction end opposite the one reaction end of one of the spring sets received therein.

15. The assembly of claim 1, wherein the one radially removable spacer is slit radially to permit opening of the spacer radially with a tool and removal of the spacer.

16. The assembly of claim 15, wherein the spacer includes a pre-weakened region opposite the slit to facilitate the opening.

17. The assembly of claim 16, wherein the pre-weakened region comprises a notch.

18. The assembly of claim 1, wherein the spring housing is secured with threaded fasteners and is repositioned by tightening the threaded fasteners on the guide members.

19. The assembly of claim 18, wherein the threaded fasteners comprise lock nuts.

20. The assembly of claim 1, wherein each of the bores has an annular collector groove and a radial drain port communicating with the collector groove; and
   the drain ports are connected to a conduit connected to a master drain port in the cylinder housing.

21. The assembly of claim 20, wherein each drain port has a three-way connector and the conduit includes flexible tubing interconnecting the three-way connectors.

* * * * *